July 7, 1959  E. B. FERNBERG  2,893,096
FASTENER STRUCTURE
Filed March 16, 1956

Inventor
Eric Birger Fernberg
by Malcolm W. Fraser
attorney

United States Patent Office 2,893,096
Patented July 7, 1959

2,893,096
FASTENER STRUCTURE
Eric Birger Fernberg, Northwood, England

Application March 16, 1956, Serial No. 572,117

1 Claim. (Cl. 24—265)

The present invention relates to a fastener which is particularly, although not exclusively, useful for securing flexible material such as that sold under the registered trademark "Rexine" to a tubular metal frame of an automobile seat and an object is to produce a new and improved fastener having the features of construction and arrangement hereinafter described.

According to one aspect of the invention a fastener comprises a single strip of stiff, resilient metal bowed to C-shape extending over a major arc of the C and having each end cut away to leave a pair of outwardly directed prongs which are folded back upon themselves so as to be directed inwardly and rearwardly with respect to the C, the distance between the points of the prongs at the respective ends of the C being approximately equal to but less than the diameter of the fastener.

A preferred form of the invention will now be described with reference to the accompanying diagrammatic drawings, in which.

Figure 1:
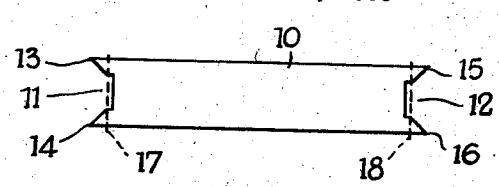
Figure 1 shows a blank from which a fastener may be made.
Figure 2:
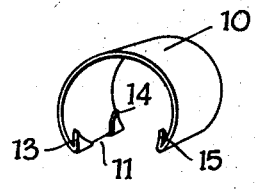
Figure 2 is a perspective view of the fastener made from the blank of Figure 1.

The fastener illustrated in Fig. 2 is formed from a single strip of steel which is blanked to the shape shown at 10 in Figure 1. The blank is formed from a parallel-sided strip and out of its ends are cut away areas 11 and 12, leaving triangular prongs 13, 14, 15, 16, and having their apices directed outwardly in the longitudinal direction of the strip. The pairs of prongs are then folded back upon themselves, about the lines 17 and 18 respectively, and the body of the strip is bowed to the part-cylindrical C-shape shown in Figure 2.

The fastener is then rendered resilient and rustproof in any suitable way.

Figure 3:
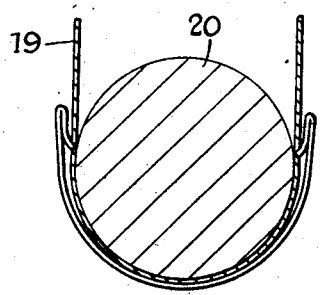
Figures 3 and 4 are elevations illustrating two ways by which the fastener of Figure 2 may be used to secure a sheet of flexible material to a rigid member.
Figure 4:
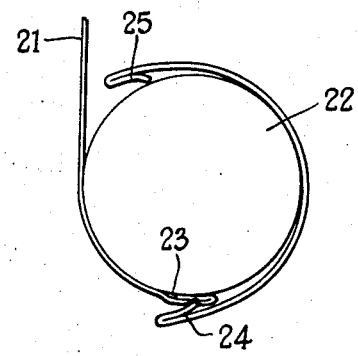

It may be used in either of the ways illustrated in Figures 3 and 4.

In Figure 3 a sheet of flexible material 19 is lapped around a rod 20 and a fastener is pushed over the material and rod so that the prongs at both ends of the fastener engage the material; in most cases the prongs pass through the material and bite into the metal rod.

As shown in Figure 4, flexible material 21 is lapped partially around a metal rod 22 and is folded inwardly at 23. At spaced intervals along the tube clips are secured over the folded edge of the Rexine and over the tube, each clip snapping over the tube into the position shown. To do this one pair of prongs (such as 24) are engaged in the Rexine, whilst it lies on the tube, where it is folded, and then the body of the clip is pressed over the tube until the other pair of prongs (such as 25) snap over the widest part of the tube. The fabric may extend to any desired distance around the tube, short of the upper prongs 25. The folding is not essential.

The strength of such fasteners may be increased by forming them with a reinforcing ridge running around the body. Alternatively a reinforcing spring may be clipped over the fastener.

The present fasteners have the following advantages:
In some situations the prongs of the present fasteners cannot be seen at all. As no prong is cut out of an edge of the metal, they do not tend to catch in anything as easily as do the others. As the prongs are at the extreme end of the strip, they can be pushed over a rod of larger diameter. For the same reason there is a slight saving of material. Finally the prongs are somewhat stronger and more satisfactory because each is bent back upon itself about a line perpendicular to the grain of the metal, which runs parallel with the longer edges of the strip, whereas in the prior clips the line of bending is oblique to the grain.

In this specification the word "tube" is used to include any tubular or rod-like member, such as a longitudinally split tube, a part-cylindrical flange on the edge of a sheet of metal, a solid rod and like members.

This application constitutes a division of my copending application filed January 26, 1954, Serial No. 406,241, and entitled "Fasteners."

What I claim is:

A fastener comprising a single strip of stiff resilient metal of C-shape extending over a major arc of the C, a pair of prongs on each end of said strip folded back upon themselves so as to be directed inwardly and rearwardly with respect to the C, the distance between the points of the prongs at the respective ends of the C being approximately equal to but less than the diameter of the fastener.

References Cited in the file of this patent

UNITED STATES PATENTS

| 484,962 | Hartshorn | Oct. 25, 1892 |
| 564,573 | Hartshorn | July 21, 1896 |
| 1,200,977 | Pierce | Oct. 10, 1916 |

FOREIGN PATENTS

| 12,000 | Great Britain | 1899 |
| 217,378 | Great Britain | June 19, 1924 |